United States Patent
Liu et al.

(10) Patent No.: US 11,038,451 B2
(45) Date of Patent: Jun. 15, 2021

(54) METHOD AND DEVICE FOR DRIVING MOTORS

(71) Applicant: Midea Group Co., Ltd., Foshan (CN)

(72) Inventors: Yi Liu, Foshan (CN); Jie Sun, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/930,366

(22) Filed: May 12, 2020

(65) Prior Publication Data

US 2020/0274472 A1  Aug. 27, 2020

Related U.S. Application Data

(63) Continuation of application No. PCT/CN2018/108562, filed on Sep. 29, 2018.

(30) Foreign Application Priority Data

Nov. 17, 2017  (CN) .......................... 201711147862.7

(51) Int. Cl.
  *H02P 21/00* (2016.01)
  *H02P 21/14* (2016.01)
(52) U.S. Cl.
  CPC ................... *H02P 21/14* (2013.01)
(58) Field of Classification Search
  CPC ........ H02P 21/14; H02P 21/22; H02P 21/141; H02P 21/24; H02P 27/06
  See application file for complete search history.

(56) References Cited

U.S. PATENT DOCUMENTS

2006/0132082 A1  6/2006 Ihm et al.
2020/0169284 A1*  5/2020 Easwaran ................ H04B 1/40

FOREIGN PATENT DOCUMENTS

| CN | 101769953 A | 7/2010 |
|---|---|---|
| CN | 102594249 A | 7/2012 |
| CN | 103944482 A | 7/2014 |
| CN | 104967375 A | 10/2015 |
| CN | 105122627 A | 12/2015 |
| CN | 107294454 A | 10/2017 |
| JP | 2010035343 A | 2/2010 |

OTHER PUBLICATIONS

Midea Group Co. Ltd., Third Office Action, CN201711147862.7, dated Jun. 30, 2020, 22 pgs.

(Continued)

*Primary Examiner* — Karen Masih
(74) *Attorney, Agent, or Firm* — Morgan, Lewis & Bockius LLP

(57) ABSTRACT

A method and device for driving a motor by synchronous calculation of sampled phase current and phase voltage, including: sampling three-phase current of a motor to obtain a current sampling value, and obtaining an instruction voltage or a sample voltage as a voltage sampling value; and performing synchronous conversion on the current sampling value and the voltage sampling value to obtain a fundamental wave voltage at a current sampling time to keep a current vector and a voltage vector input into a flux observer synchronous.

15 Claims, 2 Drawing Sheets

(56) References Cited

OTHER PUBLICATIONS

Midea Group Co. Ltd., Notice of First Review Opinion, CN201711147862.7, dated Apr. 28, 2019, 15 pgs.
Midea Group Co. Ltd., Notice of Second Review Opinion, CN201711147862.7, dated Jan. 3, 2020, 22 pgs.
Machine English Translation for: Yihua Dong, "Smart Traveling Wave Fault Location System Based on Electronic Transformer," a Dissertation Submitted to the Faculty of the School of Control Science and Engineering, in Partial Fulfillment of the Requirements for the Degree of Doctor of Philosophy in Engineering in the Graduate College Shandong University, May 15, 2013, 8 pgs.

\* cited by examiner

METHOD AND DEVICE FOR DRIVING MOTORS

CROSS-REFERENCE TO RELATED APPLICATION

This application is a continuation of PCT International Application No. PCT/CN2018/108526, filed Sep. 29, 2018, which claims priority to and benefits of Chinese Patent Application Serial No. 201711147862.7, filed Nov. 17, 2017, both of which are incorporated herein by reference in their entireties.

TECHNICAL FIELD

The present disclosure relates to a field of motor drive technologies, and more particularly to a method for synchronously calculating a sampled phase current and a phase voltage for a motor driver, a non-transitory computer-readable storage medium, a device for synchronously calculating a sampled phase current and a phase voltage for a motor driver, and a motor drive system.

BACKGROUND

For a high-performance AC motor drive system, a vector control technology, such as field-oriented control or direct torque control, is commonly used, on condition that accurate flux linkage position or speed information of the motor is acquired. In industrial, home appliance or automobile applications, in order to reduce hardware costs or ease mechanical installation restrictions, a flux observer can be used to replace position/speed sensors of the motor. In this way, the flux linkage position and speed information of the motor can be acquired by a software estimation method of the flux observer.

The flux observer needs to acquire current and voltage of the motor when estimating the flux linkage position and speed information of the motor. Specifically, the current of the motor may be acquired from hardware sampling, and the voltage of the motor may be a command voltage or acquired from the hardware sampling.

However, during the acquisition of the current and voltage of the motor as described above, a current vector and a voltage vector that are input to the flux observer may be out of synchronization. When the motor is operated at a high frequency or a digital sampling frequency (i.e., a current loop control frequency, a pulse width modulation (PWM) switching frequency) is low, non-synchronization may cause a deviation in phase angle calculated by the flux observer and affect the control performance of the motor.

SUMMARY

The present disclosure seeks to solve at least one of the problems that exist in the related art to at least some extent. Accordingly, an object of the present disclosure is to provide a method for synchronously calculating a sampled phase current and a phase voltage for a motor driver, which may improve the accuracy of the angle output by the flux observer and allow the motor to run normally.

A second object of the present disclosure is to provide a non-transitory computer-readable storage medium.

A third object of the present disclosure is to provide a device for synchronously calculating a sampled phase current and a phase voltage for a motor driver.

A fourth object of the present disclosure is to provide a motor drive system.

In order to achieve the above objects, in a first aspect, the present disclosure provides in embodiments a method for synchronously calculating a sampled phase current and a phase voltage for a motor driver, including: sampling a three-phase current of a motor to obtain a current sampling value, and obtaining a command voltage or a sampled voltage as a voltage sampling value; performing synchronous conversion on the current sampling value and the voltage sampling value to obtain a fundamental voltage at a current sampling time, to allow a current vector and a voltage vector, that are input to a flux observer, to keep synchronous.

With such a method for synchronously calculating a sampled phase current and a phase voltage for a motor driver according to the embodiments of the present disclosure, the three-phase current of the motor is sampled to obtain a current sampling value, and the command voltage or the sampled voltage is obtained as the voltage sampling value, the synchronous conversion is performed on the current sampling value and the voltage sampling value to obtain the fundamental voltage at the current sampling time, to allow the current vector and the voltage vector, that are input to the flux observer, to keep synchronous. Therefore, the method may improve the accuracy of the angle output by the flux observer and allow the motor to run normally.

In addition, the method for synchronously calculating a sampled phase current and a phase voltage for a motor driver provided in the above embodiments may further include following additional technical features.

Specifically, the synchronous conversion is performed on the current sampling value and the voltage sampling value in any one of the following manners of: (1) taking an intermediate time of two adjacent PWM carrier cycles as the current sampling time, and synchronously converting a voltage at a prior time before the current sampling time and/or a voltage at a subsequent time after the current sampling time into a voltage at the current sampling time; and (2) taking a time between two adjacent PWM carrier peaks as a reference synchronization time, and performing synchronous conversion on the current sampling value and the voltage sampling value according to the reference synchronization time.

In an embodiment of the present disclosure, the voltage at the prior time before the current sampling time is a voltage corresponding to a peak of a prior PWM carrier wave, and the voltage at the subsequent time after the current sampling time is a voltage corresponding to a peak of a subsequent PWM carrier wave.

In an embodiment of the present disclosure, the manner (1) is applied, if the voltage at the prior time before the current sampling time is synchronously converted into the voltage at the current sampling time, the voltage at the prior time is synchronously converted according to the following formula:

$$\begin{bmatrix} V_{x\alpha} \\ V_{x\beta} \end{bmatrix} = \begin{bmatrix} V_{1\alpha}\cos\theta_\Delta - V_{1\beta}\sin\theta_\Delta \\ V_{1\beta}\cos\theta_\Delta + V_{1\alpha}\sin\theta_\Delta \end{bmatrix},$$

where $V_{x\alpha}$ and $V_{x\beta}$ represent voltages at the current sampling time in the two-phase stationary coordinate system, respectively, $V_{1\alpha}$ and $V_{1\beta}$ represent voltages at the prior time in the two-phase stationary coordinate system, respectively, $\theta_\Delta = \omega_e t_\Delta$, $\omega_e$ represents an electrical angular frequency, and $t_\Delta$ represents a duration from the prior time to the current sampling time; if the voltage at the subsequent time after the current sampling time is synchronously converted into the voltage at the current sampling time, the voltage at the subsequent time is synchronously converted according to the following formula:

$$\begin{bmatrix} V_{x\alpha} \\ V_{x\beta} \end{bmatrix} = \begin{bmatrix} V_{2\alpha}\cos\theta_\Delta + V_{2\beta}\sin\theta_\Delta \\ V_{2\beta}\cos\theta_\Delta - V_{2\alpha}\sin\theta_\Delta \end{bmatrix},$$

where $V_{x\alpha}$ and $V_{x\beta}$ represent voltages at the current sampling time in the two-phase stationary coordinate system, respectively, $V_{2\alpha}$ and $V_{2\beta}$ represent voltages at the subsequent time in the two-phase stationary coordinate system, respectively, $\theta_\Delta = \omega_e t_\Delta$, $\omega_e$ represents an electrical angular frequency, and $t_\Delta$ represents a duration from the current sampling time to the subsequent time; if the voltage at the prior time before the current sampling time and the voltage at the subsequent time after the current sampling time are synchronously converted into the voltage at the current sampling time, the voltage at the prior time and the voltage at the subsequent time are synchronously converted according to the following formula:

$$\begin{bmatrix} V_{x\alpha} \\ V_{x\beta} \end{bmatrix} = \begin{bmatrix} \frac{V_{1\alpha}+V_{2\alpha}}{2}\cos\theta_\Delta + \frac{V_{2\beta}-V_{1\beta}}{2}\sin\theta_\Delta \\ \frac{V_{1\beta}+V_{2\beta}}{2}\cos\theta_\Delta + \frac{V_{1\alpha}-V_{2\alpha}}{2}\sin\theta_\Delta \end{bmatrix}.$$

In an embodiment of the present disclosure, when the manner (2) is applied, an electrical quantity at a time $t_{\Delta 1}$ before the reference synchronization time $t_x$ is $\vec{X}_1$, and an electrical quantity at a time $t_{\Delta 2}$ after the reference synchronization time $t_x$ is $\vec{X}_2$, if the electrical quantity $\vec{X}_1$ at the time $t_{\Delta 1}$ is synchronously converted into an electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{1\alpha}\cos\theta_{\Delta 1} - X_{1\beta}\sin\theta_{\Delta 1} \\ X_{1\beta}\cos\theta_{\Delta 1} + X_{1\alpha}\sin\theta_{\Delta 1} \end{bmatrix},$$

where $X_{x\alpha}$ and $X_{x\beta}$ represent electrical quantities at the reference synchronization time in a two-phase stationary coordinate system, respectively, $X_{1\alpha}$ and $X_{1\beta}$ represent electrical quantities at the time $t_{\Delta 1}$ in the two-phase stationary coordinate system, respectively, $\theta_{\Delta 1} = \omega_e t_{\Delta 1}$, and $\omega_e$ represents an electrical angular frequency; if the electrical quantity $\vec{X}_2$ at the time $t_{\Delta 2}$ is synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{2\alpha}\cos\theta_{\Delta 2} + X_{2\beta}\sin\theta_{\Delta 2} \\ X_{2\beta}\cos\theta_{\Delta 2} - X_{2\alpha}\sin\theta_{\Delta 2} \end{bmatrix},$$

where $X_{x\alpha}$ and $X_{x\beta}$ represent electrical quantities at the reference synchronization time in the two-phase stationary coordinate system, respectively, $X_{2\alpha}$ and $X_{2\beta}$ represent electrical quantities at the time $t_{\Delta 2}$ in the two-phase stationary coordinate system, respectively, $\theta_{\Delta 2} = \omega_e t_{\Delta 2}$, and $\omega_e$ represents an electrical angular frequency; if the electrical quantity $\vec{X}_1$ at the time $t_{\Delta 1}$ and the electrical quantity $\vec{X}_2$ at the time $t_{\Delta 2}$ are synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} \frac{X_{1\alpha}\cos\theta_{\Delta 1} + X_{2\alpha}\cos\theta_{\Delta 2} + X_{2\beta}\sin\theta_{\Delta 2} - X_{1\beta}\sin\theta_{\Delta 1}}{2} \\ \frac{X_{1\beta}\cos\theta_{\Delta 1} + X_{2\beta}\cos\theta_{\Delta 2} + X_{1\alpha}\sin\theta_{\Delta 1} - X_{2\alpha}\sin\theta_{\Delta 2}}{2} \end{bmatrix}.$$

In order to achieve the above objects, in a second aspect, the present disclosure provides in embodiments a non-transitory computer-readable storage medium having stored therein computer programs that, when executed by a processor, cause the processor to perform a method for synchronously calculating a sampled phase current and a phase voltage for a motor driver provided in the embodiments of the first aspect of the present disclosure.

The non-transitory computer-readable storage medium according to the embodiments of the present disclosure may improve the accuracy of the angle output by the flux observer and allow the motor to run normally.

In order to achieve the above objects, in a third aspect, the present disclosure provides in embodiments a device for synchronously calculating a sampled phase current and a phase voltage for a motor driver, including: a current sampling module configured to sample a three-phase current of a motor to obtain a current sampling value; an obtaining module configured to obtain a command voltage or a sampled voltage as a voltage sampling value; a synchronously calculating module configured to perform synchronous conversion on the current sampling value and the voltage sampling value to obtain a fundamental voltage at a current sampling time, to allow a current vector and a voltage vector, that are input to a flux observer, to keep synchronous.

With such a device for synchronously calculating a sampled phase current and a phase voltage for a motor driver according to the embodiments of the present disclosure, the current sampling module is configured to sample a three-phase current of a motor to obtain a current sampling value, an obtaining module is configured to obtain a command voltage or a sampled voltage as a voltage sampling value, a synchronously calculating module is configured to perform synchronous conversion on the current sampling value and the voltage sampling value to obtain a fundamental voltage at a current sampling time, to allow a current vector and a voltage vector, that are input to a flux observer, to keep synchronous. Therefore the device may improve the accuracy of the angle output by the flux observer and allow the motor to run normally.

In addition, the device for synchronously calculating a sampled phase current and a phase voltage for a motor driver provided in the above embodiments may further include following additional technical features.

Specifically, the synchronously calculating module is configured to perform the synchronous conversion on the current sampling value and the voltage sampling value in any one of the following manners of: (1) taking an intermediate time of two adjacent PWM carrier cycles as the current sampling time, and synchronously converting a voltage at a prior time before the current sampling time and/or a voltage at a subsequent time after the current sampling time into a voltage at the current sampling time; and (2) taking a time between two adjacent PWM carrier peaks as a reference synchronization time, and performing synchronous conversion on the current sampling value and the voltage sampling value according to the reference synchronization time.

In an embodiment of the present disclosure, the voltage at the prior time before the current sampling time is a voltage corresponding to a peak of a prior PWM carrier wave, and the voltage at the subsequent time after the current sampling time is a voltage corresponding to a peak of a subsequent PWM carrier wave.

In an embodiment of the present disclosure, the manner (1) is applied, if the voltage at the prior time before the current sampling time is synchronously converted into the voltage at the current sampling time, the voltage at the prior time is synchronously converted by the synchronously calculating module according to the following formula:

$$\begin{bmatrix} V_{x\alpha} \\ V_{x\beta} \end{bmatrix} = \begin{bmatrix} V_{1\alpha}\cos\theta_\Delta - V_{1\beta}\sin\theta_\Delta \\ V_{1\beta}\cos\theta_\Delta + V_{1\alpha}\sin\theta_\Delta \end{bmatrix},$$

where $V_{x\alpha}$ and $V_{x\beta}$ represent voltages at the current sampling time in the two-phase stationary coordinate system, respectively, $V_{1\alpha}$ and $V_{1\beta}$ represent voltages at the prior time in the two-phase stationary coordinate system, respectively, $\theta_\Delta = \omega_e t_\Delta$, $\omega_e$ represents an electrical angular frequency, and $t_\Delta$ represents a duration from the prior time to the current sampling time; if the voltage at the subsequent time after the current sampling time is synchronously converted into the voltage at the current sampling time, the voltage at the subsequent time is synchronously converted by the synchronously calculating module according to the following formula:

$$\begin{bmatrix} V_{x\alpha} \\ V_{x\beta} \end{bmatrix} = \begin{bmatrix} V_{2\alpha}\cos\theta_\Delta + V_{2\beta}\sin\theta_\Delta \\ V_{2\beta}\cos\theta_\Delta - V_{2\alpha}\sin\theta_\Delta \end{bmatrix},$$

where $V_{x\alpha}$ and $V_{x\beta}$ represent voltages at the current sampling time in the two-phase stationary coordinate system, respectively, $V_{2\alpha}$ and $V_{2\beta}$ represent voltages at the subsequent time in the two-phase stationary coordinate system, respectively, $\theta_\Delta = \omega_e t_\Delta$, $\omega_e$ represents an electrical angular frequency, and $t_\Delta$ represents a duration from the current sampling time to the subsequent time; if the voltage at the prior time before the current sampling time and the voltage at the subsequent time after the current sampling time are synchronously converted into the voltage at the current sampling time, the voltage at the prior time and the voltage at the subsequent time are synchronously converted by the synchronously calculating module according to the following formula:

$$\begin{bmatrix} V_{x\alpha} \\ V_{x\beta} \end{bmatrix} = \begin{bmatrix} \frac{V_{1\alpha} + V_{2\alpha}}{2}\cos\theta_\Delta + \frac{V_{2\beta} - V_{1\beta}}{2}\sin\theta_\Delta \\ \frac{V_{1\beta} + V_{2\beta}}{2}\cos\theta_\Delta + \frac{V_{1\alpha} - V_{2\alpha}}{2}\sin\theta_\Delta \end{bmatrix}.$$

In an embodiment of the present disclosure, when the manner (2) is applied, an electrical quantity at a time $t_{\Delta 1}$ before the reference synchronization time $t_x$ is $\vec{X}_1$, and an electrical quantity at a time $t_{\Delta 2}$ after the reference synchronization time $t_x$ is $\vec{X}_2$, if the electrical quantity $\vec{X}_1$ at the time $t_{\Delta 1}$ is synchronously converted into an electrical quantity at the reference synchronization time $t_x$, the synchronous conversion is performed by the synchronously calculating module according to the following formula:

$$\begin{bmatrix} X_{x\alpha} \\ X_{x\beta} \end{bmatrix} = \begin{bmatrix} X_{1\alpha}\cos\theta_{\Delta 1} - X_{1\beta}\sin\theta_{\Delta 1} \\ X_{1\beta}\cos\theta_{\Delta 1} + X_{1\alpha}\sin\theta_{\Delta 1} \end{bmatrix},$$

where $X_{x\alpha}$ and $X_{x\beta}$ represent electrical quantities at the reference synchronization time in a two-phase stationary coordinate system, respectively, $X_{1\alpha}$ and $X_{1\beta}$ represent electrical quantities at the time $t_{\Delta 1}$ in the two-phase stationary coordinate system, respectively, $\theta_{\Delta 1} = \omega_e t_{\Delta 1}$, and $\omega_e$ represents an electrical angular frequency; if the electrical quantity $\vec{X}_2$ at the time $t_{\Delta 2}$ is synchronously converted into the electrical quantity at the reference synchronization time $t_x$, the synchronous conversion is performed by the synchronously calculating module according to the following formula:

$$\begin{bmatrix} X_{x\alpha} \\ X_{x\beta} \end{bmatrix} = \begin{bmatrix} X_{2\alpha}\cos\theta_{\Delta 2} + X_{2\beta}\sin\theta_{\Delta 2} \\ X_{2\beta}\cos\theta_{\Delta 2} - X_{2\alpha}\sin\theta_{\Delta 2} \end{bmatrix},$$

where $X_{x\alpha}$ and $X_{x\beta}$ represent electrical quantities at the reference synchronization time in the two-phase stationary coordinate system, respectively, $X_{2\alpha}$ and $X_{2\beta}$ represent electrical quantities at the time $t_{\Delta 2}$ in the two-phase stationary coordinate system, respectively, $\theta_{\Delta 2} = \omega_e t_{\Delta 2}$, and $\omega_e$ represents an electrical angular frequency; if the electrical quantity $\vec{X}_1$ at the time $t_{\Delta 1}$ and the electrical quantity $\vec{X}_2$ at the time $t_{\Delta 2}$ are synchronously converted into the electrical quantity at the reference synchronization time $t_x$, the synchronous conversion is performed by the synchronously calculating module according to the following formula:

$$\begin{bmatrix} X_{x\alpha} \\ X_{x\beta} \end{bmatrix} = \begin{bmatrix} \frac{X_{1\alpha}\cos\theta_{\Delta 1} + X_{2\alpha}\cos\theta_{\Delta 2} + X_{2\beta}\sin\theta_{\Delta 2} - X_{1\beta}\sin\theta_{\Delta 1}}{2} \\ \frac{X_{1\beta}\cos\theta_{\Delta 1} + X_{2\beta}\cos\theta_{\Delta 2} + X_{1\alpha}\sin\theta_{\Delta 1} - X_{2\alpha}\sin\theta_{\Delta 2}}{2} \end{bmatrix}.$$

In order to achieve the above objects, in a fourth aspect, the present disclosure provides in embodiments a motor drive system, including a device for synchronously calculating a sampled phase current and a phase voltage for a motor driver provided in the embodiments of the third aspect of the present disclosure.

The motor drive system according to the embodiments of the present disclosure may improve the accuracy of the angle output by the flux observer and allow the motor to run normally.

DETAILED DESCRIPTION

Figure 1:
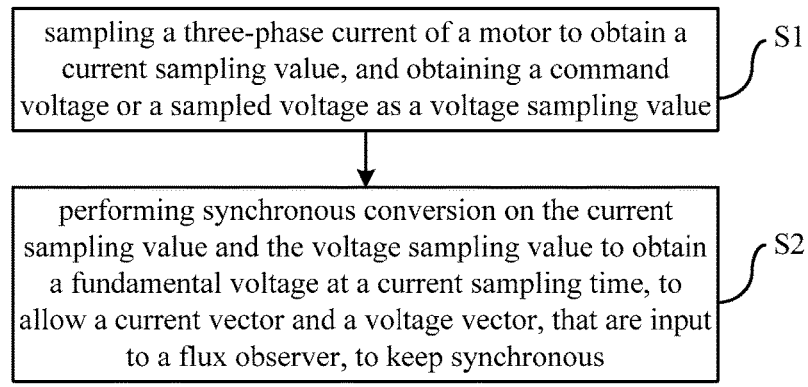
FIG. 1 is a flow chart of a method for synchronously calculating a sampled phase current and a phase voltage for a motor driver according to an embodiment of the present disclosure.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

Method and device for synchronously calculating a sampled phase current and a phase voltage for a motor driver provided in the embodiments of the present disclosure are described below with reference to the drawings.

FIG. 1 is a flow chart of a method for synchronously calculating a sampled phase current and a phase voltage for a motor driver according to an embodiment of the present disclosure.

As shown in FIG. 1, the method for synchronously calculating a sampled phase current and a phase voltage for a motor driver according to the embodiments of the present disclosure may include the following steps.

In S1, a three-phase current of a motor is sampled to obtain a current sampling value, and a command voltage or a sampled voltage is obtained as a voltage sampling value.

In an embodiment of the present disclosure, the three-phase current of the motor may be sampled by a current hardware sampling method such as two-phase sampling of lower bridge arm, three-phase sampling of lower bridge arm and sampling at AC output side, to obtain the current sampling value.

The voltage sampling value may be the command voltage or the motor sampling voltage obtained by the hardware sampling.

In S2, synchronous conversion is performed on the current sampling value and the voltage sampling value to obtain a fundamental voltage at a current sampling time, to allow a current vector and a voltage vector, that are input to a flux observer, to keep synchronous.

In an embodiment of the present disclosure, the synchronous conversion is performed on the current sampling value and the voltage sampling value in a manner (1), i.e., by taking an intermediate time of two adjacent PWM carrier cycles as the current sampling time, and synchronously converting a voltage at a prior time before the current sampling time and/or a voltage at a subsequent time after the current sampling time into a voltage at the current sampling time.

Figure 2:
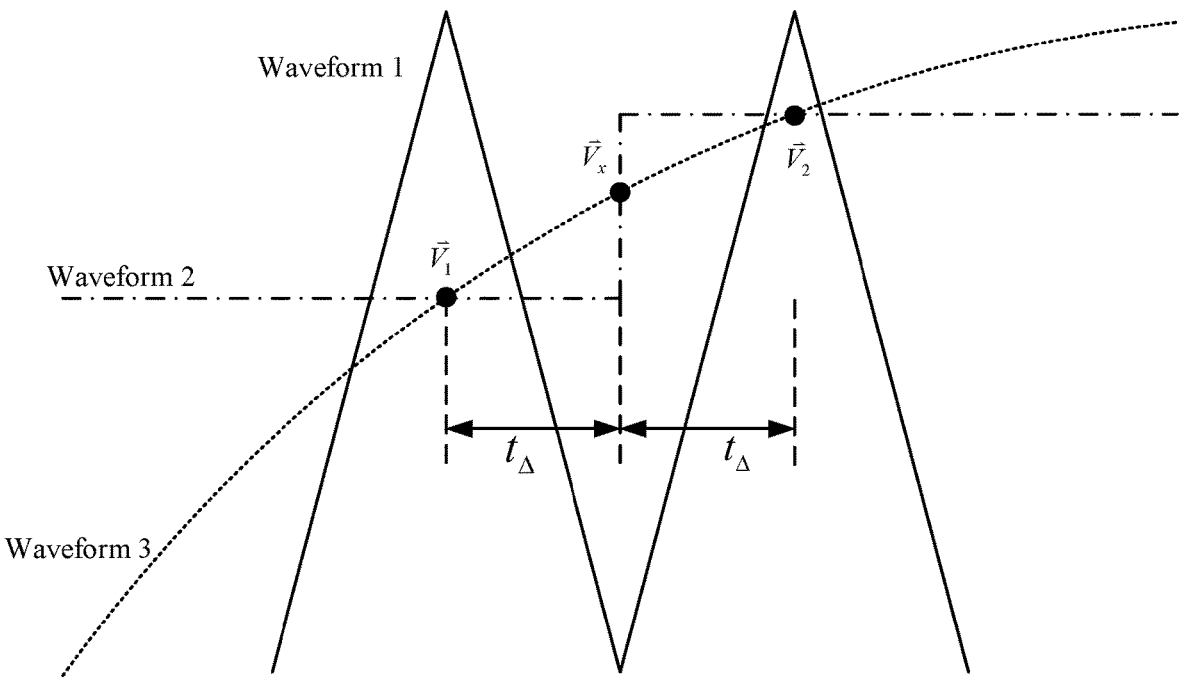
FIG. 2 is a waveform diagram showing PWM carrier wave and output voltage according to an embodiment of the present disclosure.

Specifically, as shown in FIG. 2, waveform 1 is a waveform of the PWM carrier wave (FIG. 2 only shows two cycles of the PWM carrier wave), waveform 2 is a waveform of output voltage that is an average in a switching cycle, and waveform 3 is a fundamental waveform of actual output voltage, $t_3$ represents the intermediate time of two adjacent PWM carrier cycles (i.e., the current sampling time), and $t_A$ represents a duration from the prior time to the current sampling time or a duration from the current sampling time to the subsequent time.

A voltage vector at the prior time before the current sampling time (i.e., a voltage vector corresponding to the prior PWM carrier peak) can be defined and expressed by the following formulas:

$$\vec{V}_1 = V_1 \cdot e^{j\theta_1}, \qquad (1)$$

$$\begin{bmatrix} V_{1\alpha} \\ V_{1\beta} \end{bmatrix} = \begin{bmatrix} V_1 \cos\theta_1 \\ V_1 \sin\theta_1 \end{bmatrix}, \qquad (2)$$

where $\vec{V}_1$ represents a voltage vector at the prior time before the current sampling time, $V_1, \theta_1$ represent an amplitude and a phase position of the voltage vector $\vec{V}_1$, respectively, $V_{1\alpha}$ and $V_{1\beta}$ represent voltages at the prior time in the two-phase stationary coordinate system, respectively.

A voltage vector at the subsequent time after the current sampling time (i.e., a voltage vector corresponding to the subsequent PWM carrier peak) can be defined and expressed by the following formulas:

$$\vec{V}_2 = V_2 \cdot e^{j\theta_2}, \qquad (3)$$

$$\begin{bmatrix} V_{2\alpha} \\ V_{2\beta} \end{bmatrix} = \begin{bmatrix} V_2 \cos\theta_2 \\ V_2 \sin\theta_2 \end{bmatrix}, \qquad (4)$$

where $\vec{V}_2$ represents a voltage vector at the subsequent time after the current sampling time, $V_2, \theta_2$ represent an amplitude and a phase position of the voltage vector $\vec{V}_2$, respectively, $V_{2\alpha}$ and $V_{2\beta}$ represent voltages at the subsequent time in the two-phase stationary coordinate system, respectively.

If the voltage at the prior time before the current sampling time is synchronously converted into a voltage at the current sampling time, a voltage vector at current sampling time may be obtained according to the following formulas:

$$\vec{V}_x = \vec{V}_1 \cdot e^{j\omega_e t_\Delta} = \vec{V}_1 \cdot e^{j\theta_\Delta}, \qquad (5)$$

$$\vec{V}_1 = \begin{bmatrix} V_{1\alpha} \\ V_{1\beta} \end{bmatrix} = \begin{bmatrix} V_1 \cos\theta_1 \\ V_1 \sin\theta_1 \end{bmatrix}, \qquad (6)$$

where $\vec{V}_x$ represents the voltage vector at current sampling time, $\theta_\Delta = \omega_e t_\Delta$, $\omega_e$ represents an electrical angular frequency, and $t_\Delta$ represents a duration from the prior time to the current sampling time, $V_{1\alpha}$ and $V_{1\beta}$ represent voltages at the prior time in the two-phase stationary coordinate system, respectively. The formulas (5) and (6) are processed to obtain:

$$\begin{bmatrix} V_{x\alpha} \\ V_{x\beta} \end{bmatrix} = \begin{bmatrix} V_{1\alpha}\cos\theta_{\Delta 1} - V_{1\beta}\sin\theta_{\Delta 1} \\ V_{1\beta}\cos\theta_{\Delta 1} + V_{1\alpha}\sin\theta_{\Delta 1} \end{bmatrix}, \qquad (7)$$

where $V_{x\alpha}$ and $V_{x\beta}$ represent voltages at the current sampling time in the two-phase stationary coordinate system, respectively. In this way, the voltage vector at the current sampling time, that is, the fundamental voltage at the current sampling time can be obtained, to allow the current vector and the voltage vector that are input to the flux observer to keep synchronous, thus improving the accuracy of the output quantity of the flux observer and allowing the motor to run normally.

If the voltage at the subsequent time after the current sampling time is synchronously converted into the voltage at the current sampling time, the voltage vector at the current sampling time may be obtained according to the following formulas:

$$\vec{V}_x = \vec{V}_2 \cdot e^{-j\omega_e t_\Delta} = \vec{V}_2 \cdot e^{-j\theta_\Delta}, \tag{8}$$

$$\vec{V}_2 = \begin{bmatrix} V_{2\alpha} \\ V_{2\beta} \end{bmatrix} = \begin{bmatrix} V_2 \cos\theta_2 \\ V_2 \sin\theta_2 \end{bmatrix}, \tag{9}$$

where $\vec{V}_x$ represents the voltage vector at the current sampling time, $\theta_\Delta = \omega_e t_\Delta$, $\omega_e$ represents an electrical angular frequency, and $t_\Delta$ represents a duration from the current sampling time to the subsequent time (equal to the duration from the prior time to the current sampling time), $V_{2\alpha}$ and $V_{2\beta}$ represent voltages at the subsequent time in the two-phase stationary coordinate system, respectively. The formulas (8) and (9) are processed to obtain:

$$\vec{V}_x = \vec{V}_2 \cdot e^{-j\omega_e t_\Delta} \tag{10}$$

$$\begin{bmatrix} V_{x\alpha} \\ V_{x\beta} \end{bmatrix} = \begin{bmatrix} V_{2\alpha}\cos\theta_\Delta + V_{2\beta}\sin\theta_\Delta \\ V_{2\beta}\cos\theta_\Delta - V_{2\alpha}\sin\theta_\Delta \end{bmatrix},$$

where $V_{x\alpha}$ and $V_{x\beta}$ represent voltages at the current sampling time in the two-phase stationary coordinate system, respectively. In this way, the voltage vector at the current sampling time, that is, the fundamental voltage at the current sampling time can be obtained, to allow the current vector and the voltage vector that are input to the flux observer to keep synchronous, thus improving the accuracy of the output quantity of the flux observer and allowing the motor to run normally.

If the voltage at the prior time before the current sampling time and the voltage at the subsequent time after the current sampling time are synchronously converted into the voltage at the current sampling time, the voltage vector at current sampling time may be obtained according to the following formula:

$$\vec{V}_x = \frac{1}{2}\left(\vec{V}_1 \cdot e^{j\omega_e t_\Delta} + \vec{V}_2 e^{-j\omega_e t_\Delta}\right) = \frac{1}{2}\left(\vec{V}_1 \cdot e^{j\theta_\Delta} + \vec{V}_2 \cdot e^{-j\theta_\Delta}\right), \tag{11}$$

where $\vec{V}_x$ represents the voltage vector at current sampling time, $\theta_\Delta = \omega_e t_\Delta$, $\omega_e$ represents an electrical angular frequency, and $t_\Delta$ represents the duration from the prior time to the current sampling time or the duration from the current sampling time to the subsequent time, $V_{1\alpha}$ and $V_{1\beta}$ represent voltages at the prior time in the two-phase stationary coordinate system, respectively, $V_{2\alpha}$ and $V_{2\beta}$ represent voltages at the subsequent time in the two-phase stationary coordinate system, respectively. The formulas (11), (6) and (9) are processed to obtain:

$$\begin{bmatrix} V_{x\alpha} \\ V_{x\beta} \end{bmatrix} = \begin{bmatrix} \dfrac{V_{1\alpha}+V_{2\alpha}}{2}\cos\theta_\Delta + \dfrac{V_{2\beta}-V_{1\beta}}{2}\sin\theta_\Delta \\ \dfrac{V_{1\beta}+V_{2\beta}}{2}\cos\theta_\Delta + \dfrac{V_{1\alpha}-V_{2\alpha}}{2}\sin\theta_\Delta \end{bmatrix}, \tag{12}$$

where $V_{x\alpha}$ and $V_{x\beta}$ represent voltages at the current sampling time in the two-phase stationary coordinate system, respectively. In this way, the voltage vector at the current sampling time, that is, the fundamental voltage at the current sampling time can be obtained, to allow the current vector and the voltage vector that are input to the flux observer to keep synchronous, thus improving the accuracy of the output quantity of the flux observer and allowing the motor to run normally.

Further, when $\theta_\Delta$ is approximately equal to zero, the voltage vector at the current sampling time can be obtained according to the following formulas:

$$\vec{V}_x = \frac{1}{2}(\vec{V}_1 + \vec{V}_2), \tag{13}$$

$$\begin{bmatrix} V_{x\alpha} \\ V_{x\beta} \end{bmatrix} = \begin{bmatrix} \dfrac{V_{1\alpha}+V_{2\alpha}}{2} \\ \dfrac{V_{1\beta}+V_{2\beta}}{2} \end{bmatrix}, \tag{14}$$

to allow the current vector and the voltage vector that are input to the flux observer to keep synchronous, thus improving the accuracy of the output quantity of the flux observer and allowing the motor to run normally.

In an embodiment of the present disclosure, the synchronous conversion is performed on the current sampling value and the voltage sampling value in a manner (2), i.e., by taking a time between two adjacent PWM carrier peaks as a reference synchronization time $t_x$, and performing synchronous conversion on the current sampling value and the voltage sampling value according to the reference synchronization time.

Specifically, when the manner (2) is used, an electrical quantity at a time $t_{\Delta 1}$ before the reference synchronization time $t_x$ is $\vec{X}_1$ (including a voltage vector and a current vector), and an electrical quantity at a time $t_{\Delta 2}$ after the reference synchronization time $t_x$ is $\vec{X}$ (including a voltage vector and a current vector). The electrical quantity $\vec{X}_1$ may be expressed by the following formulas:

$$\vec{X}_1 = X_1 \cdot e^{j\theta_1} \tag{15}$$

$$\begin{bmatrix} X_{1\alpha} \\ X_{1\beta} \end{bmatrix} = \begin{bmatrix} X_1 \cos\theta_1 \\ X_1 \sin\theta_1 \end{bmatrix}, \tag{16}$$

where $X_1, \theta_1$ represent an amplitude and a phase position of the electrical quantity $\vec{X}_1$, respectively, $X_{1\alpha}$ and $X_{1\beta}$ represent electrical quantities at the time $t_{\Delta 1}$ in the two-phase stationary coordinate system, respectively.

The electrical quantity $\vec{X}_2$ may be expressed by the following formulas:

$$\vec{X}_2 = X_2 \cdot e^{j\theta_2} \tag{17}$$

$$\begin{bmatrix} X_{2\alpha} \\ X_{2\beta} \end{bmatrix} = \begin{bmatrix} X_2 \cos\theta_2 \\ X_2 \sin\theta_2 \end{bmatrix}, \tag{18}$$

where $X_2, \theta_2$ represent an amplitude and a phase position of the electrical quantity $\vec{X}_2$, respectively, $X_{2\alpha}$ and $X_{2\beta}$ represent electrical quantities at the time $t_{\Delta 2}$ in the two-phase stationary coordinate system, respectively.

If the electrical quantity $\vec{X}_1$ at the time $t_{\Delta 1}$ is synchronously converted into an electrical quantity at the reference synchronization time $t_x$, the electrical quantity at the reference synchronization time $t_x$ may be obtained according to the following formulas:

$$\vec{X}_x = \vec{X}_1 \cdot e^{j\omega_e t_{\Delta 1}} = \vec{X}_1 \cdot e^{j\theta_{\Delta 1}}, \qquad (19)$$

$$\vec{X}_1 = \begin{bmatrix} X_{1\alpha} \\ X_{1\beta} \end{bmatrix} = \begin{bmatrix} X_1 \cos\theta_1 \\ X_1 \sin\theta_1 \end{bmatrix}, \qquad (20)$$

where $\vec{X}_x$ represents the electrical quantity at the reference synchronization time $t_x$, $\theta_{\Delta 1}=\omega_e t_{\Delta 1}$, and $\omega_e$ represents an electrical angular frequency. The formulas (19) and (20) are processed to obtain:

$$\vec{X}_x = \begin{bmatrix} X_{x\alpha} \\ X_{x\beta} \end{bmatrix} = \begin{bmatrix} X_{1\alpha}\cos\theta_{\Delta 1} - X_{1\beta}\sin\theta_{\Delta 1} \\ X_{1\beta}\cos\theta_{\Delta 1} + X_{1\alpha}\sin\theta_{\Delta 1} \end{bmatrix}, \qquad (21)$$

that is, the electrical quantity $\vec{X}_1$ at the time $t_{\Delta 1}$ (including a voltage vector at the time $t_{\Delta 1}$ and a current vector at the time $t_{\Delta 1}$) may be synchronously converted into the electrical quantity $\vec{X}_x$ at the reference synchronization time $t_x$ (including a voltage vector at the reference synchronization time $t_x$ and a current vector at the reference synchronization time $t_x$) via calculation, to allow the current vector and the voltage vector that are input to the flux observer to keep synchronous, thus improving the accuracy of the output quantity of the flux observer and allowing the motor to run normally.

If the electrical quantity $\vec{X}_2$ at the time $t_{\Delta 2}$ is synchronously converted into the electrical quantity at the reference synchronization time $t_x$, the electrical quantity at the reference synchronization time $t_x$ may be obtained according to the following formulas:

$$\vec{X}_x = \vec{X}_2 \cdot e^{-j\omega_e t_{\Delta 2}} = \vec{X}_2 \cdot e^{-j\theta_{\Delta 2}}, \qquad (22)$$

$$\vec{X}_2 = \begin{bmatrix} X_{2\alpha} \\ X_{2\beta} \end{bmatrix} = \begin{bmatrix} X_2 \cos\theta_2 \\ X_2 \sin\theta_2 \end{bmatrix}, \qquad (23)$$

where $\vec{X}_x$ represents the electrical quantity at the reference synchronization time $t_x$, $\theta_{\Delta 2}=\omega_e t_{\Delta 2}$, and $\omega_e$ represents an electrical angular frequency. The formulas (22) and (23) are processed to obtain:

$$\vec{X}_x = \vec{X}_2 \cdot e^{-j\omega_e t_{\Delta 2}} \qquad (24)$$

$$\begin{bmatrix} X_{x\alpha} \\ X_{x\beta} \end{bmatrix} = \begin{bmatrix} X_{2\alpha}\cos\theta_{\Delta 2} + X_{2\beta}\sin\theta_{\Delta 2} \\ X_{2\beta}\cos\theta_{\Delta 2} - X_{2\alpha}\sin\theta_{\Delta 2} \end{bmatrix},$$

that is, the electrical quantity $\vec{X}_2$ at the time $t_{\Delta 2}$ (including a voltage vector at the time $t_{\Delta 2}$ and a current vector at the time $t_{\Delta 2}$) may be synchronously converted into the electrical quantity $\vec{X}_x$ at the reference synchronization time $t_x$ (including a voltage vector at the reference synchronization time $t_x$ and a current vector at the reference synchronization time $t_x$ via calculation, to allow the current vector and the voltage vector that are input to the flux observer to keep synchronous, thus improving the accuracy of the output quantity of the flux observer and allowing the motor to run normally.

If the electrical quantity $\vec{X}_1$ at the time $t_{\Delta 1}$ and the electrical quantity $\vec{X}_2$ at the time $t_{\Delta 2}$ are synchronously converted into the electrical quantity at the reference synchronization time $t_x$, the electrical quantity at the reference synchronization time $t_x$ may be obtained according to the following formula:

$$\vec{X}_x = \tfrac{1}{2}(\vec{X}_1 \cdot e^{j\omega_e t_{\Delta 1}} + \vec{X}_2 \cdot e^{-j\omega_e t_{\Delta 2}}) = \tfrac{1}{2}(\vec{X}_1 \cdot e^{j\theta_{\Delta 1}} + \vec{X}_2 \cdot e^{-j\theta_{\Delta 2}}) \qquad (25)$$

where $\vec{X}_x$ represents the electrical quantity at the reference synchronization time $t_x$, $\theta_{\Delta 1}=\omega_e t_{\Delta 1}$, $\theta_{\Delta 2}=\omega_e t_{\Delta 2}$, and $\omega_e$ represents an electrical angular frequency. The formulas (20), (23) and (25) are processed to obtain:

$$\begin{bmatrix} X_{x\alpha} \\ X_{x\beta} \end{bmatrix} = \begin{bmatrix} \dfrac{X_{1\alpha}\cos\theta_{\Delta 1} + X_{2\alpha}\cos\theta_{\Delta 2} + X_{2\beta}\sin\theta_{\Delta 2} - X_{1\beta}\sin\theta_{\Delta 1}}{2} \\ \dfrac{X_{1\beta}\cos\theta_{\Delta 1} + X_{2\beta}\cos\theta_{\Delta 2} + X_{1\alpha}\sin\theta_{\Delta 1} - X_{2\alpha}\sin\theta_{\Delta 2}}{2} \end{bmatrix}, \qquad (26)$$

that is, the electrical quantity $\vec{X}_1$ at the time $t_{\Delta 1}$ (including a voltage vector at the time $t_{\Delta 1}$ and a current vector at the time $t_{\Delta 1}$) and the electrical quantity $\vec{X}_2$ at the time $t_{\Delta 2}$ (including a voltage vector at the time $t_{\Delta 2}$ and a current vector at the time $t_{\Delta 2}$) may be synchronously converted into the electrical quantity $\vec{X}_x$ at the reference synchronization time $t_x$ (including a voltage vector at the reference synchronization time $t_x$ and a current vector at the reference synchronization time $t_x$) via calculation, to allow the current vector and the voltage vector that are input to the flux observer to keep synchronous, thus improving the accuracy of the output quantity of the flux observer and allowing the motor to run normally.

Further, when $\theta_{\Delta 1}$ and $\theta_{\Delta 2}$ are approximately equal to zero, the voltage vector at the current sampling time can be obtained according to the following formulas:

$$\vec{X}_x = \frac{1}{2}(\vec{X}_1 + \vec{X}_2) \qquad (27)$$

$$\begin{bmatrix} X_{x\alpha} \\ X_{x\beta} \end{bmatrix} = \begin{bmatrix} \dfrac{X_{1\alpha} + X_{2\alpha}}{2} \\ \dfrac{X_{1\beta} + X_{2\beta}}{2} \end{bmatrix}, \qquad (28)$$

to allow the current vector and the voltage vector that are input to the flux observer to keep synchronous, thus improving the accuracy of the output quantity of the flux observer and allowing the motor to run normally.

With such a method for synchronously calculating a sampled phase current and a phase voltage for a motor driver according to the embodiments of the present disclosure, the three-phase current of the motor is sampled to obtain a current sampling value, and the command voltage or the sampled voltage is obtained as the voltage sampling value, the synchronous conversion is performed on the current sampling value and the voltage sampling value to obtain the fundamental voltage at the current sampling time, to allow the current vector and the voltage vector, that are input to the flux observer, to keep synchronous. Therefore, the method may improve the accuracy of the angle output by the flux observer and allow the motor to run normally.

Corresponding to the above embodiments, the present disclosure further provides a non-transitory computer-readable storage medium.

The non-transitory computer-readable storage medium according to the embodiments of the present disclosure has stored therein computer programs that, when executed by a processor, cause the processor to perform a method for synchronously calculating a sampled phase current and a phase voltage for a motor driver provided in the above embodiments of the present disclosure.

With the non-transitory computer-readable storage medium according to the embodiments of the present disclosure, the computer programs stored therein can be executed, so as to improve the accuracy of the angle output by the flux observer and allow the motor to run normally.

Corresponding to the above embodiments, the present disclosure further provides a device for synchronously calculating a sampled phase current and a phase voltage for a motor driver.

Figure 3:
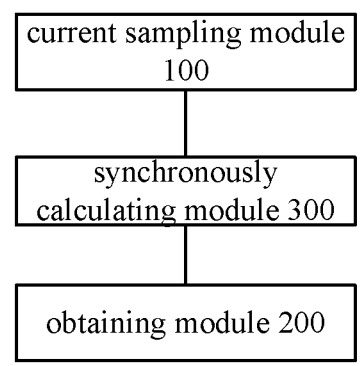
FIG. 3 is a block diagram of a device for synchronously calculating a sampled phase current and a phase voltage for a motor driver according to an embodiment of the present disclosure.

As shown in FIG. 3, the device for synchronously calculating a sampled phase current and a phase voltage for a motor driver includes a current sampling module 100, an obtaining module 200 and a synchronously calculating module 300. The current sampling module 100 is configured to sample a three-phase current of a motor to obtain a current sampling value. The obtaining module 200 is configured to obtain a command voltage or a sampled voltage as a voltage sampling value. The synchronously calculating module 300 is configured to perform synchronous conversion on the current sampling value and the voltage sampling value to obtain a fundamental voltage at a current sampling time, to allow a current vector and a voltage vector, that are input to a flux observer, to keep synchronous.

In an embodiment of the present disclosure, the synchronously calculating module 300 is configured to perform the synchronous conversion on the current sampling value and the voltage sampling value in a manner (1), i.e., by taking an intermediate time of two adjacent PWM carrier cycles as the current sampling time, and synchronously converting a voltage at a prior time before the current sampling time and/or a voltage at a subsequent time after the current sampling time into a voltage at the current sampling time.

Specifically, as shown in FIG. 2, waveform 1 is a waveform of the PWM carrier wave (FIG. 2 only shows two cycles of the PWM carrier wave), waveform 2 is a waveform of output voltage that is an average in a switching cycle, and waveform 3 is a fundamental waveform of actual output voltage, $t_3$ represents the intermediate time of two adjacent PWM carrier cycles (i.e., the current sampling time), and $t_\Delta$ represents a duration from the prior time to the current sampling time or a duration from the current sampling time to the subsequent time.

A voltage vector at the prior time before the current sampling time (i.e., a voltage vector corresponding to the prior PWM carrier peak) can be defined and expressed by the following formulas:

$$\vec{V}_1 = V_1 \cdot e^{j\theta_1}, \quad (1)$$

$$\begin{bmatrix} V_{1\alpha} \\ V_{1\beta} \end{bmatrix} = \begin{bmatrix} V_1 \cos\theta_1 \\ V_1 \sin\theta_1 \end{bmatrix}, \quad (2)$$

where $\vec{V}_1$ represents a voltage vector at the prior time before the current sampling time, $V_1, \theta_1$ represent an amplitude and a phase position of the voltage vector $\vec{V}_1$, respectively, $V_{1\alpha}$ and $V_{1\beta}$ represent voltages at the prior time in the two-phase stationary coordinate system, respectively.

A voltage vector at the subsequent time after the current sampling time (i.e., a voltage vector corresponding to the subsequent PWM carrier peak) can be defined and expressed by the following formulas:

$$\vec{V}_2 = V_2 \cdot e^{j\theta_2}, \quad (3)$$

$$\begin{bmatrix} V_{2\alpha} \\ V_{2\beta} \end{bmatrix} = \begin{bmatrix} V_2 \cos\theta_2 \\ V_2 \sin\theta_2 \end{bmatrix}, \quad (4)$$

where $\vec{V}_2$ represents a voltage vector at the subsequent time after the current sampling time, $V_2, \theta_2$ represent an amplitude and a phase position of the voltage vector $\vec{V}_2$, respectively, $V_{2\alpha}$ and $V_{2\beta}$ represent voltages at the subsequent time in the two-phase stationary coordinate system, respectively.

If the voltage at the prior time before the current sampling time is synchronously converted into a voltage at the current sampling time, a voltage vector at current sampling time may be obtained by the synchronously calculating module 300 according to the following formulas:

$$\vec{V}_x = \vec{V}_1 \cdot e^{j\omega_e t_\Delta} = \vec{V}_1 \cdot e^{j\theta_\Delta}, \quad (5)$$

$$\vec{V}_1 = \begin{bmatrix} V_{1\alpha} \\ V_{1\beta} \end{bmatrix} = \begin{bmatrix} V_1 \cos\theta_1 \\ V_1 \sin\theta_1 \end{bmatrix}, \quad (6)$$

where $\vec{V}_x$ represents the voltage vector at current sampling time, $\theta_\Delta = \omega_e t_\Delta$, $\omega_e$ represents an electrical angular frequency, and $t_\Delta$ represents a duration from the prior time to the current sampling time, $V_{1\alpha}$ and $V_{1\beta}$ represent voltages at the prior time in the two-phase stationary coordinate system, respectively. The formulas (5) and (6) are processed by the synchronously calculating module 300 to obtain:

$$\begin{bmatrix} V_{x\alpha} \\ V_{x\beta} \end{bmatrix} = \begin{bmatrix} V_{1\alpha} \cos\theta_\Delta - V_{1\beta} \sin\theta_\Delta \\ V_{1\beta} \cos\theta_\Delta + V_{1\alpha} \sin\theta_\Delta \end{bmatrix}, \quad (7)$$

where $V_{x\alpha}$ and $V_{x\beta}$ represent voltages at the current sampling time in the two-phase stationary coordinate system, respectively. In this way, the voltage vector at the current sampling time, that is, the fundamental voltage at the current sampling time can be obtained, to allow the current vector and the voltage vector that are input to the flux observer to keep synchronous, thus improving the accuracy of the output quantity of the flux observer and allowing the motor to run normally.

If the voltage at the subsequent time after the current sampling time is synchronously converted into the voltage at the current sampling time, the voltage vector at the current sampling time may be obtained by the synchronously calculating module 300 according to the following formulas:

$$\vec{V}_x = \vec{V}_2 \cdot e^{-j\omega_e t_\Delta} = \vec{V}_2 \cdot e^{-j\theta_\Delta}, \quad (8)$$

$$\vec{V}_2 = \begin{bmatrix} V_{2\alpha} \\ V_{2\beta} \end{bmatrix} = \begin{bmatrix} V_2 \cos\theta_2 \\ V_2 \sin\theta_2 \end{bmatrix}, \quad (9)$$

where $\vec{V}_x$ represents the voltage vector at the current sampling time, $\theta_\Delta = \omega_e t_\Delta$, $\omega_e$ represents an electrical angular frequency, and $t_\Delta$ represents a duration from the current sampling time to the subsequent time (equal to the duration from the prior time to the current sampling time), $V_{2\alpha}$ and $V_{2\beta}$ represent voltages at the subsequent time in the two-phase stationary coordinate system, respectively. The formulas (8) and (9) are processed by the synchronously calculating module 300 to obtain:

$$\vec{V}_x = \vec{V}_2 \cdot e^{-j\omega_e t_\Delta} \quad (10)$$

$$\begin{bmatrix} V_{x\alpha} \\ V_{x\beta} \end{bmatrix} = \begin{bmatrix} V_{2\alpha} \cos\theta_\Delta + V_{2\beta} \sin\theta_\Delta \\ V_{2\beta} \cos\theta_\Delta - V_{2\alpha} \sin\theta_\Delta \end{bmatrix}.$$

where $V_{x\alpha}$ and $V_{x\beta}$ represent voltages at the current sampling time in the two-phase stationary coordinate system, respectively. In this way, the voltage vector at the current sampling time, that is, the fundamental voltage at the current sampling time can be obtained, to allow the current vector and the voltage vector that are input to the flux observer to keep synchronous, thus improving the accuracy of the output quantity of the flux observer and allowing the motor to run normally.

If the voltage at the prior time before the current sampling time and the voltage at the subsequent time after the current sampling time are synchronously converted into the voltage at the current sampling time, the voltage vector at current sampling time may be obtained by the synchronously calculating module 300 according to the following formula:

$$\vec{V}_x = \frac{1}{2}(\vec{V}_1 \cdot e^{j\omega_e t_\Delta} + \vec{V}_2 \cdot e^{-j\omega_e t_\Delta}) = \frac{1}{2}(\vec{V}_1 \cdot e^{j\theta_\Delta} + \vec{V}_2 \cdot e^{-j\theta_\Delta}) \quad (11)$$

where $\vec{V}_x$ represents the voltage vector at current sampling time, $\theta_\Delta = \omega_e t_\Delta$, $\omega_e$ represents an electrical angular frequency, and $t_\Delta$ represents the duration from the prior time to the current sampling time or the duration from the current sampling time to the subsequent time, $V_{1\alpha}$ and $V_{1\beta}$ represent voltages at the prior time in the two-phase stationary coordinate system, respectively, $V_{2\alpha}$ and $V_{2\beta}$ represent voltages at the subsequent time in the two-phase stationary coordinate system, respectively. The formulas (11), (6) and (9) are processed by the synchronously calculating module 300 to obtain:

$$\begin{bmatrix} V_{x\alpha} \\ V_{x\beta} \end{bmatrix} = \begin{bmatrix} \frac{V_{1\alpha} + V_{2\alpha}}{2}\cos\theta_\Delta + \frac{V_{2\beta} - V_{1\beta}}{2}\sin\theta_\Delta \\ \frac{V_{1\beta} + V_{2\beta}}{2}\cos\theta_\Delta + \frac{V_{1\alpha} - V_{2\alpha}}{2}\sin\theta_\Delta \end{bmatrix}, \quad (12)$$

where $V_{x\alpha}$ and $V_{x\beta}$ represent voltages at the current sampling time in the two-phase stationary coordinate system, respectively. In this way, the voltage vector at the current sampling time, that is, the fundamental voltage at the current sampling time can be obtained, to allow the current vector and the voltage vector that are input to the flux observer to keep synchronous, thus improving the accuracy of the output quantity of the flux observer and allowing the motor to run normally.

Further, when $\theta_\Delta$ is approximately equal to zero, the voltage vector at the current sampling time can be obtained by the synchronously calculating module 300 according to the following formulas:

$$\vec{V}_x = \frac{1}{2}(\vec{V}_1 + \vec{V}_2), \quad (13)$$

$$\begin{bmatrix} V_{x\alpha} \\ V_{x\beta} \end{bmatrix} = \begin{bmatrix} \frac{V_{1\alpha} + V_{2\alpha}}{2} \\ \frac{V_{1\beta} + V_{2\beta}}{2} \end{bmatrix}, \quad (14)$$

to allow the current vector and the voltage vector that are input to the flux observer to keep synchronous, thus improving the accuracy of the output quantity of the flux observer and allowing the motor to run normally.

In an embodiment of the present disclosure, the synchronously calculating module 300 is configured to perform the synchronous conversion on the current sampling value and the voltage sampling value in a manner (2), i.e., by taking a time between two adjacent PWM carrier peaks as a reference synchronization time $t_x$, and performing synchronous conversion on the current sampling value and the voltage sampling value according to the reference synchronization time.

Specifically, when the manner (2) is used, an electrical quantity at a time $t_{\Delta 1}$ before the reference synchronization time $t_x$ is $\vec{X}_1$ (including a voltage vector and a current vector), and an electrical quantity at a time $t_{\Delta 2}$ after the reference synchronization time $t_x$ is $\vec{X}_2$ (including a voltage vector and a current vector). The electrical quantity $\vec{X}_1$ may be expressed by the following formulas:

$$\vec{X}_1 = X_1 \cdot e^{j\theta_1}, \quad (15)$$

$$\begin{bmatrix} X_{1\alpha} \\ X_{1\beta} \end{bmatrix} = \begin{bmatrix} X_1 \cos\theta_1 \\ X_1 \sin\theta_1 \end{bmatrix}, \quad (16)$$

where $X_1, \theta_1$ represent an amplitude and a phase position of the electrical quantity $\vec{X}_1$, respectively, $X_{1\alpha}$ and $X_{1\beta}$ represent electrical quantities at the time $t_{\Delta 1}$ in the two-phase stationary coordinate system, respectively.

The electrical quantity $\vec{X}_2$ may be expressed by the following formulas:

$$\vec{X}_2 = X_2 \cdot e^{j\theta_2}, \quad (17)$$

$$\begin{bmatrix} X_{2\alpha} \\ X_{2\beta} \end{bmatrix} = \begin{bmatrix} X_2 \cos\theta_2 \\ X_2 \sin\theta_2 \end{bmatrix}, \quad (18)$$

where $X_2, \theta_2$ represent an amplitude and a phase position of the electrical quantity $\vec{X}_2$, respectively, $X_{2\alpha}$ and $X_{2\beta}$ represent electrical quantities at the time $t_{\Delta 2}$ in the two-phase stationary coordinate system, respectively.

If the electrical quantity $\vec{X}_1$ at the time $t_{\Delta 1}$ is synchronously converted into an electrical quantity at the reference synchronization time $t_x$, the electrical quantity at the reference synchronization time $t_x$ may be obtained by the synchronously calculating module 300 according to the following formulas:

$$\vec{X}_x = \vec{X}_1 \cdot e^{j\omega_e t_{\Delta 1}} = \vec{X}_1 \cdot e^{j\theta_{\Delta 1}}, \quad (19)$$

$$\vec{X}_1 = \begin{bmatrix} X_{1\alpha} \\ X_{1\beta} \end{bmatrix} = \begin{bmatrix} X_1 \cos\theta_1 \\ X_1 \sin\theta_1 \end{bmatrix}, \quad (20)$$

where $\vec{X}_x$ represents the electrical quantity at the reference synchronization time $t_x$, $\theta_{\Delta 1} \omega_e t_{\Delta 1}$, and $\omega_e$ represents an electrical angular frequency. The formulas (19) and (20) are processed by the synchronously calculating module 300 to obtain:

$$\vec{X}_x = \begin{bmatrix} X_{x\alpha} \\ X_{x\beta} \end{bmatrix} = \begin{bmatrix} X_{1\alpha} \cos\theta_{\Delta 1} - X_{1\beta} \sin\theta_{\Delta 1} \\ X_{1\beta} \cos\theta_{\Delta 1} + X_{1\alpha} \sin\theta_{\Delta 1} \end{bmatrix}, \quad (21)$$

that is, the electrical quantity $\vec{X}_1$ at the time $t_{\Delta 1}$ (including a voltage vector at the time $t_{\Delta 1}$ and a current vector at the time $t_{\Delta 1}$) may be synchronously converted into the electrical quantity $\vec{X}_x$ at the reference synchronization time $t_x$ (including a voltage vector at the reference synchronization time $t_x$ and a current vector at the reference synchronization time $t_x$) via calculation, to allow the current vector and the voltage vector that are input to the flux observer to keep synchronous, thus improving the accuracy of the output quantity of the flux observer and allowing the motor to run normally.

If the electrical quantity $\vec{X}_2$ at the time $t_{\Delta 2}$ is synchronously converted into the electrical quantity at the reference synchronization time $t_x$, the electrical quantity at the reference synchronization time $t_x$ may be obtained by the synchronously calculating module 300 according to the following formulas:

$$\vec{X}_x = \vec{X}_2 \cdot e^{-j\omega_e t_{\Delta 2}} = \vec{X}_2 \cdot e^{-j\theta_{\Delta 2}}, \quad (22)$$

$$\vec{X}_2 = \begin{bmatrix} X_{2\alpha} \\ X_{2\beta} \end{bmatrix} = \begin{bmatrix} X_2 \cos\theta_2 \\ X_2 \sin\theta_2 \end{bmatrix}, \quad (23)$$

where $\vec{X}_x$ represents the electrical quantity at the reference synchronization time $t_x$, $\theta_{\Delta 2} = \omega_e t_{\Delta 2}$, and $\omega_e$ represents an electrical angular frequency. The formulas (22) and (23) are processed to obtain:

$$\vec{X}_x = \vec{X}_2 \cdot e^{-j\omega_e t_{\Delta 2}} \quad (24)$$

$$\begin{bmatrix} X_{x\alpha} \\ X_{x\beta} \end{bmatrix} = \begin{bmatrix} X_{2\alpha} \cos\theta_{\Delta 2} + X_{2\beta} \sin\theta_{\Delta 2} \\ X_{2\beta} \cos\theta_{\Delta 2} - X_{2\alpha} \sin\theta_{\Delta 2} \end{bmatrix},$$

that is, the electrical quantity $\vec{X}_2$ at the time $t_{\Delta 2}$ (including a voltage vector at the time $t_{\Delta 2}$ and a current vector at the time $t_{\Delta 2}$) may be synchronously converted into the electrical quantity $\vec{X}_x$ at the reference synchronization time $t_x$ (including a voltage vector at the reference synchronization time $t_x$ and a current vector at the reference synchronization time $t_x$) via calculation, to allow the current vector and the voltage vector that are input to the flux observer to keep synchronous, thus improving the accuracy of the output quantity of the flux observer and allowing the motor to run normally.

If the electrical quantity $\vec{X}_1$ at the time $t_{\Delta 1}$ and the electrical quantity $\vec{X}_2$ at the time $t_{\Delta 2}$ are synchronously converted into the electrical quantity at the reference synchronization time $t_x$, the electrical quantity at the reference synchronization time $t_x$ may be obtained by the synchronously calculating module 300 according to the following formula:

$$\vec{X}_x = \tfrac{1}{2}(\vec{X}_1 \cdot e^{j\omega_e t_{\Delta 1}} + \vec{X}_2 \cdot e^{-j\omega_e t_{\Delta 2}}) = \tfrac{1}{2}(\vec{X}_1 \cdot e^{j\theta_{\Delta 1}} + \vec{X}_2 \cdot e^{-j\theta_{\Delta 2}}), \quad (25)$$

where $\vec{X}_x$ represents the electrical quantity at the reference synchronization time $t_x$, $\theta_{\Delta 1} = \omega_e t_{\Delta 1}$, $\theta_{\Delta 2} = \omega_e t_{\Delta 2}$, and $\omega_e$ represents an electrical angular frequency. The formulas (20), (23) and (25) are processed to obtain:

$$\begin{bmatrix} X_{x\alpha} \\ X_{x\beta} \end{bmatrix} = \begin{bmatrix} \dfrac{X_{1\alpha}\cos\theta_{\Delta 1} + X_{2\alpha}\cos\theta_{\Delta 2} + X_{2\beta}\sin\theta_{\Delta 2} - X_{1\beta}\sin\theta_{\Delta 1}}{2} \\ \dfrac{X_{1\beta}\cos\theta_{\Delta 1} + X_{2\beta}\cos\theta_{\Delta 2} + X_{1\alpha}\sin\theta_{\Delta 1} - X_{2\alpha}\sin\theta_{\Delta 2}}{2} \end{bmatrix}, \quad (26)$$

that is, the electrical quantity $\vec{X}_1$ at the time $t_{\Delta 1}$ (including a voltage vector at the time $t_{\Delta 1}$ and a current vector at the time $t_{\Delta 1}$) and the electrical quantity $\vec{X}_2$ at the time $t_{\Delta 2}$ (including a voltage vector at the time $t_{\Delta 2}$ and a current vector at the time $t_{\Delta 2}$) may be synchronously converted into the electrical quantity $\vec{X}_x$ at the reference synchronization time $t_x$ (including a voltage vector at the reference synchronization time $t_x$ and a current vector at the reference synchronization time $t_x$) via calculation, to allow the current vector and the voltage vector that are input to the flux observer to keep synchronous, thus improving the accuracy of the output quantity of the flux observer and allowing the motor to run normally.

Further, when $\theta_{\Delta 1}$ and $\theta_{\Delta 2}$ are approximately equal to zero, the voltage vector at the current sampling time can be obtained by the synchronously calculating module 300 according to the following formulas:

$$\vec{X}_x = \frac{1}{2}(\vec{X}_1 + \vec{X}_2), \quad (27)$$

$$\begin{bmatrix} X_{x\alpha} \\ X_{x\beta} \end{bmatrix} = \begin{bmatrix} \dfrac{X_{1\alpha} + X_{2\alpha}}{2} \\ \dfrac{X_{1\beta} + X_{2\beta}}{2} \end{bmatrix}, \quad (28)$$

to allow the current vector and the voltage vector that are input to the flux observer to keep synchronous, thus improving the accuracy of the output quantity of the flux observer and allowing the motor to run normally.

With such a device for synchronously calculating a sampled phase current and a phase voltage for a motor driver according to the embodiments of the present disclosure, the current sampling module is configured to sample a three-phase current of a motor to obtain a current sampling value, an obtaining module is configured to obtain a command voltage or a sampled voltage as a voltage sampling value, a synchronously calculating module is configured to perform synchronous conversion on the current sampling value and the voltage sampling value to obtain a fundamental voltage at a current sampling time, to allow a current vector and a voltage vector, that are input to a flux observer, to keep synchronous. Therefore the device may improve the accuracy of the angle output by the flux observer and allow the motor to run normally.

Corresponding to the above embodiments, the present disclosure further provides a motor drive system.

The motor drive system according to the embodiments of the present disclosure includes a device for synchronously calculating a sampled phase current and a phase voltage for a motor driver provided in the above embodiments of the present disclosure, specific embodiments of the motor drive system may refer to the embodiments described above, which are not described herein again to avoid redundancy.

The motor drive system according to the embodiments of the present disclosure may improve the accuracy of the angle output by the flux observer and allow the motor to run normally.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial" and "circumferential" should be construed to refer to the orientation as then described or as shown in the drawings under discussion. These relative terms are for convenience of description and do not require that the present disclosure be constructed or operated in a particular orientation, and thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom " the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

It should be noted that, as used herein, the terms "including," "comprising," or any other variations thereof are intended to cover a non-exclusive inclusion such that a process, method, article, or apparatus that includes a series of elements includes not only those elements, but other elements as well that have not expressly listed, or further includes elements inherent to such processes, methods, articles, or apparatuses. Without further limitations, an element modified by the phrase "including a . . . " does not exclude the existence of additional identical elements in the process, method, article, or apparatus that includes this element.

Sequence numbers applied to the foregoing embodiments according to the present disclosure are merely for description purposes and are not intended to indicate the advantages and disadvantages of these embodiments.

Through the above description of the embodiments, those skilled in the art can clearly understand that the above-mentioned method embodiments can be implemented by means of software plus a necessary universal hardware platform. Of course, they can also be implemented by hardware, but in many cases the former will be better. Based on such an understanding, the essential technical solution of this disclosure, or the portion that contributes to the prior art may be embodied as software products. Computer software products can be stored in a storage medium (such as a ROM/RAM, a magnetic disk, or an optical disc), and can include multiple instructions that when executed cause a device (e.g., a device including one or more processors and memory), to execute the methods in accordance with various embodiments.

The foregoing merely illustrates some exemplary embodiments of this disclosure and is not intended as limiting the patentable scope of the disclosure. Any equivalent configurational or flow transformations made taking advantage of the foregoing description and accompanying drawings of this disclosure, or any direct or indirect applications in other related technical fields will all be compassed within the patentable scope of this disclosure.

What is claimed is:

1. A method, comprising:
sampling a three-phase current of a motor to obtain a current sampling value and a voltage sampling value, wherein the voltage sampling value is a command voltage or a sampled voltage; and performing synchronous conversion on the current sampling value and the voltage sampling value to obtain a fundamental voltage at a current sampling time to keep a current vector and a voltage vector synchronous, wherein the current vector and the voltage vector are input to a flux observer.

2. The method of claim 1, wherein the synchronous conversion is performed on the current sampling value and the voltage sampling value, including:

taking an intermediate time of two adjacent pulse width modulation (PWM) carrier cycles as the current sampling time, and synchronously converting a voltage at a prior time before the current sampling time and/or a voltage at a subsequent time after the current sampling time into a voltage at the current sampling time; or taking a time between two adjacent PWM carrier peaks as a reference synchronization time, and synchronously converting the current sampling value and the voltage sampling value according to the reference synchronization time.

3. The method of claim 2, wherein the voltage at the prior time before the current sampling time is a voltage corresponding to a peak of a prior PWM carrier wave, and the voltage at the subsequent time after the current sampling time is a voltage corresponding to a peak of a subsequent PWM carrier wave.

4. The method of claim 3, wherein synchronously converting the voltage at the prior time before the current sampling time into the voltage at the current sampling time is performed according to the following formula:

$$\begin{bmatrix} V_{x\alpha} \\ V_{x\beta} \end{bmatrix} = \begin{bmatrix} V_{1\alpha} \cos\theta_\Delta - V_{1\beta} \sin\theta_\Delta \\ V_{1\beta} \cos\theta_\Delta + V_{1\alpha} \sin\theta_\Delta \end{bmatrix},$$

where $V_{x\alpha}$ and $V_{x\beta}$ represent voltages at the current sampling time in the two-phase stationary coordinate system, respectively, $V_{1\alpha}$ and $V_{1\beta}$ represent voltages at the prior time in the two-phase stationary coordinate system, respectively, $\theta_\Delta = \omega_e t_\Delta$, $\omega_e$ represents an electrical angular frequency, and $t_\Delta$ represents a duration from the prior time to the current sampling time;

wherein synchronously converting the voltage at the subsequent time after the current sampling time into the voltage at the current sampling time is performed according to the following formula:

$$\begin{bmatrix} V_{x\alpha} \\ V_{x\beta} \end{bmatrix} = \begin{bmatrix} V_{2\alpha} \cos\theta_\Delta + V_{2\beta} \sin\theta_\Delta \\ V_{2\beta} \cos\theta_\Delta - V_{2\alpha} \sin\theta_\Delta \end{bmatrix},$$

where $V_{x\alpha}$ and $V_{x\beta}$ represent voltages at the current sampling time in the two-phase stationary coordinate system, respectively, $V_{2\alpha}$ and $V_{2\beta}$ represent voltages at the subsequent time in the two-phase stationary coordinate system, respectively, $\theta_\Delta = \omega_e t_\Delta$, $\omega_e$ represents an electrical angular frequency, and $t_\Delta$ represents a duration from the current sampling time to the subsequent time; and wherein synchronously converting the voltage at the prior time before the current sampling time and the voltage at the subsequent time after the current sampling time into the voltage at the current sampling time is performed according to the following formula:

$$\begin{bmatrix} V_{x\alpha} \\ V_{x\beta} \end{bmatrix} = \begin{bmatrix} \frac{V_{1\alpha} + V_{2\alpha}}{2} \cos\theta_\Delta + \frac{V_{2\beta} - V_{1\beta}}{2} \sin\theta_\Delta \\ \frac{V_{1\beta} + V_{2\beta}}{2} \cos\theta_\Delta + \frac{V_{1\alpha} - V_{2\alpha}}{2} \sin\theta_\Delta \end{bmatrix}.$$

5. The method of claim 2, wherein synchronously converting the current sampling value and the voltage sampling value according to the reference synchronization time includes:

determining an electrical quantity $\vec{X}_1$ at a time $t_{\Delta 1}$ before the reference synchronization time $t_x$ and an electrical quantity $\vec{X}_2$ at a time $t_{\Delta 2}$ after the reference synchronization time $t_x$;

if the electrical quantity $\vec{X}_1$ at the time $t_{\Delta 1}$ is synchronously converted into an electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{1\alpha} \cos\theta_{\Delta 1} - X_{1\beta} \sin\theta_{\Delta 1} \\ X_{1\beta} \cos\theta_{\Delta 1} + X_{1\alpha} \sin\theta_{\Delta 1} \end{bmatrix},$$

where $X_{x\alpha}$ and $X_{x\beta}$ represent electrical quantities at the reference synchronization time in a two-phase stationary coordinate system, respectively, $X_{1\alpha}$ and $X_{1\beta}$ represent electrical quantities at the time $t_{\Delta 1}$ in the two-phase stationary coordinate system, respectively, $\theta_{\Delta 1} = \omega_e t_{\Delta 1}$, and $\omega_e$ represents an electrical angular frequency;

if the electrical quantity $\vec{X}_2$ at the time $t_{\Delta 2}$ is synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{2\alpha} \cos\theta_{\Delta 2} + X_{2\beta} \sin\theta_{\Delta 2} \\ X_{2\beta} \cos\theta_{\Delta 2} - X_{2\alpha} \sin\theta_{\Delta 2} \end{bmatrix},$$

where $X_{x\alpha}$ and $X_{x\beta}$ represent electrical quantities at the reference synchronization time in the two-phase stationary coordinate system, respectively, $X_{2\alpha}$ and $X_{2\beta}$ represent electrical quantities at the time $t_{\Delta 2}$ in the two-phase stationary coordinate system, respectively, $\theta_{\Delta 2} = \omega_e t_{\Delta 2}$, and $\omega_e$ represents an electrical angular frequency; and if the electrical quantity $\vec{X}_1$ at the time $t_{\Delta 1}$ and the electrical quantity $\vec{X}_2$ at the time $t_{\Delta 2}$ are synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} \frac{X_{1\alpha} \cos\theta_{\Delta 1} + X_{2\alpha} \cos\theta_{\Delta 2} + X_{2\beta} \sin\theta_{\Delta 2} - X_{1\beta} \sin\theta_{\Delta 1}}{2} \\ \frac{X_{1\beta} \cos\theta_{\Delta 1} + X_{2\beta} \cos\theta_{\Delta 2} + X_{1\alpha} \sin\theta_{\Delta 1} - X_{2\alpha} \sin\theta_{\Delta 2}}{2} \end{bmatrix}.$$

6. A non-transitory computer-readable storage medium storing one or more computer programs comprising instructions that, when executed by an electronic device, cause the electronic device to:
  sample a three-phase current of a motor to obtain a current sampling value and a voltage sampling value, wherein the voltage sampling value is a command voltage or a sampled voltage; and
  perform synchronous conversion on the current sampling value and the voltage sampling value to obtain a fundamental voltage at a current sampling time to keep a current vector and a voltage vector synchronous, wherein the current vector and the voltage vector are input to a flux ob server.

7. The computer-readable storage medium of claim 6, wherein the synchronous conversion is performed on the current sampling value and the voltage sampling value, including:
  taking an intermediate time of two adjacent pulse width modulation (PWM) carrier cycles as the current sampling time, and synchronously converting a voltage at a prior time before the current sampling time and/or a voltage at a subsequent time after the current sampling time into a voltage at the current sampling time; or
  taking a time between two adjacent PWM carrier peaks as a reference synchronization time, and synchronously converting the current sampling value and the voltage sampling value according to the reference synchronization time.

8. The computer-readable storage medium of claim 7, wherein the voltage at the prior time before the current sampling time is a voltage corresponding to a peak of a prior PWM carrier wave, and the voltage at the subsequent time after the current sampling time is a voltage corresponding to a peak of a subsequent PWM carrier wave.

9. The computer-readable storage medium of claim 8, wherein synchronously converting the voltage at the prior time before the current sampling time into the voltage at the current sampling time is performed according to the following formula:

$$\begin{bmatrix} V_{x\alpha} \\ V_{x\beta} \end{bmatrix} = \begin{bmatrix} V_{1\alpha}\cos\theta_\Delta - V_{1\beta}\cos\theta_\Delta \\ V_{1\beta}\cos\theta_\Delta + V_{1\alpha}\cos\theta_\Delta \end{bmatrix},$$

where $V_{x\alpha}$ and $V_{x\beta}$ represent voltages at the current sampling time in the two-phase stationary coordinate system, respectively, $V_{1\alpha}$ and $V_{1\beta}$ represent voltages at the prior time in the two-phase stationary coordinate system, respectively, $\theta_\Delta = \omega_e t_\Delta$, $\omega_e$ represents an electrical angular frequency, and $t_A$ represents a duration from the prior time to the current sampling time;

wherein synchronously converting the voltage at the subsequent time after the current sampling time into the voltage at the current sampling time is performed according to the following formula:

$$\begin{bmatrix} V_{x\alpha} \\ V_{x\beta} \end{bmatrix} = \begin{bmatrix} V_{2\alpha}\cos\theta_\Delta + V_{2\beta}\sin\theta_\Delta \\ V_{2\beta}\cos\theta_\Delta - V_{2\alpha}\sin\theta_\Delta \end{bmatrix},$$

where $V_{x\alpha}$ and $V_{x\beta}$ represent voltages at the current sampling time in the two-phase stationary coordinate system, respectively, $V_{2\alpha}$ and $V_{2\beta}$ represent voltages at the subsequent time in the two-phase stationary coordinate system, respectively, $\theta_\Delta = \omega_e t_\Delta$, $\omega_e$ represents an electrical angular frequency, and $t_\Delta$ represents a duration from the current sampling time to the subsequent time; and wherein synchronously converting the voltage at the prior time before the current sampling time and the voltage at the subsequent time after the current sampling time into the voltage at the current sampling time is performed according to the following formula:

$$\begin{bmatrix} V_{x\alpha} \\ V_{x\beta} \end{bmatrix} = \begin{bmatrix} \frac{V_{1\alpha} + V_{2\alpha}}{2}\cos\theta_\Delta + \frac{V_{2\beta} - V_{1\beta}}{2}\sin\theta_\Delta \\ \frac{V_{1\beta} + V_{2\beta}}{2}\cos\theta_\Delta + \frac{V_{1\alpha} - V_{2\alpha}}{2}\sin\theta_\Delta \end{bmatrix}.$$

10. The computer-readable storage medium of claim 7, wherein synchronously converting the current sampling value and the voltage sampling value according to the reference synchronization time includes:
  determining an electrical quantity $\vec{X}_1$ at a time $t_{\Delta1}$ before the reference synchronization time $t_x$ and an electrical quantity $\vec{X}_2$ at a time $t_{\Delta2}$ after the reference synchronization time $t_x$;

if the electrical quantity $\vec{X}_1$ at the time $t_{\Delta1}$ is synchronously converted into an electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{1\alpha}\cos\theta_{\Delta1} - X_{1\beta}\sin\theta_{\Delta1} \\ X_{1\beta}\cos\theta_{\Delta1} + X_{1\alpha}\sin\theta_{\Delta1} \end{bmatrix},$$

where $X_{x\alpha}$ and $X_{x\beta}$ represent electrical quantities at the reference synchronization time in a two-phase stationary coordinate system, respectively, $X_{1\alpha}$ and $X_{1\beta}$ represent electrical quantities at the time $t_{\Delta1}$ in the two-phase stationary coordinate system, respectively, $\theta_{\Delta1} = \omega_e t_{\Delta1}$, and $\omega_e$ represents an electrical angular frequency;

if the electrical quantity $\vec{X}_2$ at the time $t_{\Delta2}$ is synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{2\alpha}\cos\theta_{\Delta2} + X_{2\beta}\sin\theta_{\Delta2} \\ X_{2\beta}\cos\theta_{\Delta2} - X_{2\alpha}\sin\theta_{\Delta2} \end{bmatrix},$$

where $X_{x\alpha}$ and $X_{x\beta}$ represent electrical quantities at the reference synchronization time in the two-phase stationary coordinate system, respectively, $X_{2\alpha}$ and $X_{2\beta}$ represent electrical quantities at the time $t_{\Delta2}$ in the two-phase stationary coordinate system, respectively, $\theta_{\Delta2} = \omega_e t_{\Delta2}$, and $\omega_e$ represents an electrical angular frequency; and if the electrical quantity $\vec{X}_1$ at the time $t_{\Delta1}$ and the electrical quantity $\vec{X}_2$ at the time $t_{\Delta2}$ are synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} \dfrac{X_{1\alpha}\cos\theta_{\Delta 1} + X_{2\alpha}\cos\theta_{\Delta 2} + X_{2\beta}\sin\theta_{\Delta 2} - X_{1\beta}\sin\theta_{\Delta 1}}{2} \\ \dfrac{X_{1\beta}\cos\theta_{\Delta 1} + X_{2\beta}\cos\theta_{\Delta 2} + X_{1\alpha}\sin\theta_{\Delta 1} - X_{2\alpha}\sin\theta_{\Delta 2}}{2} \end{bmatrix}.$$

11. A motor driving system including one or more processors, memory, and one or more non-transitory computer programs, wherein the one or more non-transitory computer programs are stored in the memory and configured to be executed by the one or more processors, the one or more non-transitory computer programs including instructions for:

sampling a three-phase current of a motor to obtain a current sampling value and a voltage sampling value, wherein the voltage sampling value is a command voltage or a sampled voltage; and performing synchronous conversion on the current sampling value and the voltage sampling value to obtain a fundamental voltage at a current sampling time to keep a current vector and a voltage vector synchronous, wherein the current vector and the voltage vector are input to a flux observer.

12. The motor driving system of claim 11, wherein the synchronous conversion is performed on the current sampling value and the voltage sampling value, including:

taking an intermediate time of two adjacent pulse width modulation (PWM) carrier cycles as the current sampling time, and synchronously converting a voltage at a prior time before the current sampling time and/or a voltage at a subsequent time after the current sampling time into a voltage at the current sampling time; or taking a time between two adjacent PWM carrier peaks as a reference synchronization time, and synchronously converting the current sampling value and the voltage sampling value according to the reference synchronization time.

13. The motor driving system of claim 12, wherein the voltage at the prior time before the current sampling time is a voltage corresponding to a peak of a prior PWM carrier wave, and the voltage at the subsequent time after the current sampling time is a voltage corresponding to a peak of a subsequent PWM carrier wave.

14. The motor driving system of claim 13, wherein synchronously converting the voltage at the prior time before the current sampling time into the voltage at the current sampling time is performed according to the following formula:

$$\begin{bmatrix} V_{x\alpha} \\ V_{x\beta} \end{bmatrix} = \begin{bmatrix} V_{1\alpha}\cos\theta_\Delta - V_{1\beta}\sin\theta_\Delta \\ V_{1\beta}\cos\theta_\Delta + V_{1\alpha}\sin\theta_\Delta \end{bmatrix},$$

where $V_{x\alpha}$ and $V_{x\beta}$ represent voltages at the current sampling time in the two-phase stationary coordinate system, respectively, $V_{1\alpha}$ and $V_{1\beta}$ represent voltages at the prior time in the two-phase stationary coordinate system, respectively, $\theta_\Delta = \omega_e t_\Delta$, $\omega_e$ represents an electrical angular frequency, and $t_\Delta$ represents a duration from the prior time to the current sampling time;

wherein synchronously converting the voltage at the subsequent time after the current sampling time into the voltage at the current sampling time is performed according to the following formula:

$$\begin{bmatrix} V_{x\alpha} \\ V_{x\beta} \end{bmatrix} = \begin{bmatrix} V_{2\alpha}\cos\theta_\Delta + V_{2\beta}\sin\theta_\Delta \\ V_{2\beta}\cos\theta_\Delta - V_{2\alpha}\sin\theta_\Delta \end{bmatrix},$$

where $V_{x\alpha}$ and $V_{x\beta}$ represent voltages at the current sampling time in the two-phase stationary coordinate system, respectively, $V_{2\alpha}$ and $V_{2\beta}$ represent voltages at the subsequent time in the two-phase stationary coordinate system, respectively, $\theta_\Delta = \omega_e t_{66}$, $\omega_e$ represents an electrical angular frequency, and $t_\Delta$ represents a duration from the current sampling time to the subsequent time; and wherein synchronously converting the voltage at the prior time before the current sampling time and the voltage at the subsequent time after the current sampling time into the voltage at the current sampling time is performed according to the following formula:

$$\begin{bmatrix} V_{x\alpha} \\ V_{x\beta} \end{bmatrix} = \begin{bmatrix} \dfrac{V_{1\alpha} + V_{2\alpha}}{2}\cos\theta_\Delta + \dfrac{V_{2\beta} - V_{1\beta}}{2}\sin\theta_\Delta \\ \dfrac{V_{1\beta} + V_{2\beta}}{2}\cos\theta_\Delta + \dfrac{V_{1\alpha} - V_{2\alpha}}{2}\sin\theta_\Delta \end{bmatrix}.$$

15. The motor driving system of claim 12, wherein synchronously converting the current sampling value and the voltage sampling value according to the reference synchronization time includes:

determining an electrical quantity $\vec{X}_1$ at a time $t_{\Delta 1}$ before the reference synchronization time $t_x$ and an electrical quantity $\vec{X}_2$ at a time $t_{\Delta 2}$ after the reference synchronization time $t_x$;

if the electrical quantity $\vec{X}_1$ at the time $t_{\Delta 1}$ is synchronously converted into an electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{1\alpha}\cos\theta_{\Delta 1} - X_{1\beta}\sin\theta_{\Delta 1} \\ X_{1\beta}\cos\theta_{\Delta 1} + X_{1\alpha}\sin\theta_{\Delta 1} \end{bmatrix},$$

where $X_{x\alpha}$ and $X_{x\beta}$ represent electrical quantities at the reference synchronization time in a two-phase stationary coordinate system, respectively, $X_{1\alpha}$ and $X_{1\beta}$ represent electrical quantities at the time $t_{\Delta 1}$ in the two-phase stationary coordinate system, respectively, $\theta_{\Delta 1} = \omega_e t_{\Delta 1}$, and $\omega_e$ represents an electrical angular frequency;

if the electrical quantity $\vec{X}_2$ at the time $t_{\Delta 2}$ is synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} X_{2\alpha}\cos\theta_{\Delta 2} + X_{2\beta}\sin\theta_{\Delta 2} \\ X_{2\beta}\cos\theta_{\Delta 2} - X_{2\alpha}\sin\theta_{\Delta 2} \end{bmatrix},$$

where $X_{x\alpha}$ and $X_{x\beta}$ represent electrical quantities at the reference synchronization time in the two-phase stationary coordinate system, respectively, $X_{2\alpha}$ and $W_{2\beta}$ represent electrical quantities at the time $t_{\Delta 2}$ in the two-phase stationary coordinate system, respectively, $\theta_{\Delta 2}=\omega_e t_{\Delta 2}$, and $\omega_e$ represents an electrical angular frequency; and if the electrical quantity $\vec{X}_1$ at the time $t_{\Delta 1}$ and the electrical quantity $\vec{X}_2$ at the time $t_{\Delta 2}$ are synchronously converted into the electrical quantity at the reference synchronization time $t_x$, the synchronous conversion is performed according to the following formula:

$$\begin{bmatrix} X_{x\alpha} \\ X_{x\beta} \end{bmatrix} = \begin{bmatrix} \dfrac{X_{1\alpha}\cos\theta_{\Delta 1} + X_{2\alpha}\cos\theta_{\Delta 2} + X_{2\beta}\sin\theta_{\Delta 2} - X_{1\beta}\sin\theta_{\Delta 1}}{2} \\ \dfrac{X_{1\beta}\cos\theta_{\Delta 1} + X_{2\beta}\cos\theta_{\Delta 2} + X_{1\alpha}\sin\theta_{\Delta 1} - X_{2\alpha}\sin\theta_{\Delta 2}}{2} \end{bmatrix}.$$

\* \* \* \* \*